US011942749B2

(12) United States Patent
Bredbeck

(10) Patent No.: US 11,942,749 B2
(45) Date of Patent: Mar. 26, 2024

(54) PLUG CONNECTION DEVICE COMPRISING AT LEAST ONE PLUG CONNECTOR

(71) Applicant: Rosenberger Hochfrequenztechnik GmbH & Co. KG, Fridolfing (DE)

(72) Inventor: Till Bredbeck, Traunstein (DE)

(73) Assignee: Rosenberger Hochfrequenztechnik Gmbh & Co KG, Fridolfing (DE)

( * ) Notice: Subject to any disclaimer, the term of this patent is extended or adjusted under 35 U.S.C. 154(b) by 898 days.

(21) Appl. No.: 16/990,455

(22) Filed: Aug. 11, 2020

(65) Prior Publication Data

US 2020/0403347 A1 Dec. 24, 2020

Related U.S. Application Data

(63) Continuation of application No. 15/768,934, filed as application No. PCT/EP2017/060797 on May 5, 2017, now Pat. No. 10,784,615.

(30) Foreign Application Priority Data

May 6, 2016 (DE) ..................... 10 2016 108 402.6
May 20, 2016 (DE) ..................... 10 2016 109 266.5

(51) Int. Cl.
*H01R 13/436* (2006.01)
*H01R 4/64* (2006.01)
(Continued)

(52) U.S. Cl.
CPC ............. *H01R 9/0524* (2013.01); *H01R 4/64* (2013.01); *H01R 9/0512* (2013.01);
(Continued)

(58) Field of Classification Search
CPC .................................................... H01R 9/0527
See application file for complete search history.

(56) References Cited

U.S. PATENT DOCUMENTS 4,741,703 A 5/1988 Johescu et al.
5,240,425 A 8/1993 Sato et al.
(Continued)

FOREIGN PATENT DOCUMENTS

CN 101884142 A 11/2010
CN 102714359 A 10/2012
(Continued)

OTHER PUBLICATIONS

International Search Report Written Opinion dated Jul. 19, 2017 issued by the United States Patent and Trademark Office as Internatinal Searching Authority in connection with related International Application No. PCT/EP2017/060797 (12 pages).

*Primary Examiner* — James Harvey
(74) *Attorney, Agent, or Firm* — Donald S. Showalter, Esq.; GrayRobinnson, P.A.

(57) ABSTRACT

A plug connection device for connecting an electrical cable and establishing a ground connection to an external component may have at least one plug connector and fastening means electrically and mechanically connectable therewith. The plug connector may have a housing and a plug body which is connectable to a conductor of the electrical cable and receivable in an axial direction in a receptacle of the housing. The contact element may plug into the housing to make electrical contact with the plug body received in the receptacle. The contact element and connection element are electrically connected to one another. The connection element may be connected to a ground cable that is connectable with the external component to establish, independently of the electrical cable, the ground connection with the external component via the plug body, contact element, connection part and the ground cable.

17 Claims, 8 Drawing Sheets

(51) Int. Cl.

| | |
|---|---|
| ***H01R 9/05*** | (2006.01) |
| ***H01R 13/73*** | (2006.01) |
| ***H01R 24/56*** | (2011.01) |
| *H01R 103/00* | (2006.01) |

(52) U.S. Cl.
CPC ......... *H01R 13/4361* (2013.01); *H01R 13/73* (2013.01); *H01R 24/56* (2013.01); *H01R 9/0527* (2013.01); *H01R 2103/00* (2013.01); *H01R 2201/26* (2013.01)

(56) References Cited

U.S. PATENT DOCUMENTS

| | | | | |
|---|---|---|---|---|
| 5,402,315 | A * | 3/1995 | Reichle | H05K 3/0052 439/100 |
| 6,171,150 | B1 | 1/2001 | Saito et al. | |
| 6,533,615 | B2 * | 3/2003 | Koide | H01R 13/748 439/545 |
| 7,553,201 | B2 * | 6/2009 | Imai | H01R 13/73 439/607.09 |
| 7,611,363 | B2 | 11/2009 | Nakamura | |
| 8,100,704 | B1 | 1/2012 | Wei | |
| 10,439,331 | B2 * | 10/2019 | Maesoba | H01R 13/6581 |
| 2003/0176104 | A1 | 9/2003 | Hall et al. | |
| 2004/0229516 | A1 | 11/2004 | Kan | |
| 2005/0118865 | A1 | 6/2005 | Henningsen | |
| 2007/0054543 | A1 | 3/2007 | Moll | |
| 2019/0058296 | A1 | 2/2019 | Bredbeck | |
| 2019/0229453 | A1 | 7/2019 | Peng | |

FOREIGN PATENT DOCUMENTS

| | | | |
|---|---|---|---|
| CN | 204067733 | U | 12/2014 |
| CN | 205026616 | U | 2/2016 |
| DE | 101 63 296 | A1 | 10/2002 |
| DE | 20 2008 014 541 | U1 | 3/2009 |
| DE | 10 2008 060 642 | A1 | 7/2009 |
| DE | 10 2014 201 522 | A1 | 7/2014 |
| EP | 0971442 | A1 | 1/2000 |
| JP | H 05-027977 | | 2/1993 |
| JP | H 07-312262 | A | 11/1995 |
| JP | H 09-147991 | A | 6/1997 |
| JP | 11067362 Aa | | 3/1999 |
| JP | 2000-021486 | A | 1/2000 |
| JP | 2001-155822 | A | 6/2001 |
| JP | 2002208455 | A | 7/2002 |
| JP | 2005-108756 | A | 4/2005 |
| JP | 2009-140684 | A | 6/2009 |
| WO | 2015/180836 | | 12/2015 |

* cited by examiner

PLUG CONNECTION DEVICE COMPRISING AT LEAST ONE PLUG CONNECTOR

CROSS-REFERENCE TO RELATED APPLICATIONS

This is a Divisional of and claims priority to co-pending, commonly-owned U.S. patent application Ser. No. 15/768,934 filed Apr. 17, 2028 which issued on Sep. 22, 2020 as U.S. Pat. No. 10,784,615 and was a U.S. National Phase Entry under 35 U.S.C. § 371 of International Application No. PCT/EP2017/060797 filed May 5, 2017 entitled: PLUG CONNECTION DEVICE COMPRISING AT LEAST ONE PLUG CONNECTOR, which designated the United States and at least one other country in addition to the United States and claimed priority to German Patent Application No. 10 2016 108 402.6 filed May 6, 2016 and German Patent Application No. 10 2016 109 266.5 filed May 20, 2016.

STATEMENT REGARDING FEDERALLY SPONSORED-RESEARCH OR DEVELOPMENT

Not applicable.

INCORPORATION BY REFERENCE

U.S. patent application Ser. No. 15/768,934, International Application No. PCT/EP2017/060797, German Patent Application German Patent Application No. 10 2016 108 402.6 filed May 6, 2016 and German Patent Application No. 10 2016 109 266.5 filed May 20, 2016 are each expressly incorporated herein by reference in their entireties to form part of the present disclosure.

FIELD OF THE INVENTION

The invention relates to a the field of electrical plug connection devices and more particularly, to electrical plug connection devices used for making connections with electrical cables of the type having an outer conductor and at least one inner conductor.

BACKGROUND

In the assembly of cables, the conductors thereof are typically connected using a plug connector. The plug connector can be a plug, a socket, or an adapter. The term plug connector used in the context of the invention represents all variants.

The plug connector serves for establishing an electrical connection to a respective, complementary further plug connector.

In order for the cable to be connected to the plug connector, a plug body which is connected to an outer conductor of the cable is typically provided. The plug connector furthermore has at least one inner conductor part which is provided for connecting to an inner conductor of the cable. The number of inner conductors, or inner conductor parts, respectively, presently is not limited, wherein commonplace plug connectors, in particular HF plug connectors, or plug connectors for coaxial cables, respectively, in most instances only have one inner conductor part for connecting to an inner conductor of the cable.

The known plug connectors have a housing, preferably a plastics housing, having a receptacle for inserting the at least one plug body.

Connecting the plug body to the outer conductor of the cable, or the at least one inner conductor part to an inner conductor of the cable, respectively, can be performed by way of known measures, usually by means of soldering/brazing, adhesive bonding, clamping, or crimping.

A connection of the cable to the plug connector can be established in that, in a first step, a segment of the cable jacket of the cable is stripped. On account thereof, an outer conductor is exposed. The outer conductor can be, for example, a braided cable shield. A support sleeve is subsequently crimped onto the braided cable shield, specifically in such a manner that the braided cable shield projects beyond the support sleeve. The projecting braided cable shield, in a next operational step, can be folded back and placed over the support sleeve. The front end of the cable can subsequently be further stripped such that an inner conductor of the cable is exposed. The exposed inner conductor of the cable can then subsequently be connected to the inner conductor part of the plug connector, preferably in such a manner that the inner conductor part is crimped thereon. The stripped front end of the cable is subsequently inserted into the plug body. The plug connector is preferably crimped onto the outer conductor of the cable, or onto the braided cable shield which is preferably folded back over the support sleeve, respectively. The plug body is thus connected to the outer conductor of the cable in a reliable manner by crimping, and the inner conductor part is located so as to be protected within the plug body.

It is subsequently provided that the cable jacket of the cable is stripped preferably 10 to 15 mm behind the plug connector and a metal clamp is crimped directly onto the braided cable shield of the cable. A reliable or low-resistance, respectively, ground connection to, for example, the body of a vehicle, which is electrically connected to a negative terminal of a battery is established by the metal clamp when the plug is used in a vehicle.

Attaching the metal clamp directly to the braided shield of the cable has the disadvantage that the cable jacket is additionally violated in order for any contact with the braided cable shield to be possible in the first place.

The present invention is not limited to the use in a vehicle, wherein the term vehicle comprises any transportation means in the context of the invention, in particular terrestrial, nautical, or aeronautical vehicles, including spacecraft.

The invention is not limited to a specific plug connection device, or to a specific plug connector, respectively, wherein the invention is particularly suitable for assembling HF cables. The plug connector herein can be preferably configured as an HF plug connector, in particular a PL plug connector, a BNC plug connector, a TNC plug connector, an SMBA (FAKRA) plug connector, an N plug connector, a 7/16 plug connector, an SMA plug connector, an SMB plug connector, an SMS plug connector, an SMC plug connector, or an SMP plug connector.

The plug connector can be configured as a so-called FAKRA plug connector which conforms to the so-called FAKRA standardization scheme (FAKRA=Fachkreis Automobiltechnik [Automobile Expert Group]) for SMB connections. A plastics housing which holds and protects the plug body, and prepositions the latter for the plugging procedure to another plug connector having a plastics housing, is provided herein. The housing can additionally have mechanical coding features such that only matching houses can be plugged into one another.

A coaxial plug connector having a plastics housing, which conforms to the so-called FAKRA standardization scheme for SMB connections is known from US 2003/0176104 A1.

Plastics housings of this type for coaxial plug connectors, which are also referred to as FAKRA housings, are used for data transmission cables in the automotive industry. These data transmission cables are usually coaxial cables, or cables which are shielded in a similar manner and based on a single electrical conductor. The mechanical dimensions of FAKRA housings of this type in the interface region, that is to say in an axial portion of the housing, which interacts with a complementary plug connector so as to establish a mechanical connection between the two plastics housings, are set forth in the October 2004 edition of DIN 72594-1.

The invention is particularly suitable for plug connectors of this type.

When the plug body is inserted into the housing, for example a FAKRA housing, it is essential that the connecting dimensions are properly adhered to, in order for a complementary connector to be able to be connected to the plug connector without any damage arising and furthermore also for the signal transmission to be optimal.

It is known in the prior art for a securing element which in the prior art is referred to as a secondary securing feature, to be inserted into the housing so as to fix the plugged-in plug body in the terminal position. The secondary securing feature herein is inserted into the housing orthogonally to the plug-in direction of the plug body.

The known plug connectors, in particular also the plug connectors according to the FAKRA standardization scheme, enable a secure and reliable connection to a complementary plug connector. However, there is one disadvantage in that the cable jacket for establishing a ground connection has to be additionally violated in order for the outer conductor, in particular the braided shield, of the cable to be contacted. Moreover, contacting the braided shield and stripping the cable jacket require a corresponding effort in the assembly, and is a risk to the functional reliability.

BRIEF SUMMARY OF THE INVENTION

The present invention is based on the object of simplifying the assembly and improving the functional reliability in the case of a plug connection device.

The plug connection device according to the invention has at least one plug connector. The plug connector herein has a housing, at least one plug body for connecting to an outer conductor of a cable, and at least one inner conductor part for connecting to an inner conductor of the cable.

The plug body preferably has means for connecting to the outer conductor, and the inner conductor part preferably has means for connecting to the inner conductor of the cable.

Each plug connector preferably has only one plug body; however, it is also possible for a plurality of plug bodies to be assigned to one plug connector.

Depending on the design embodiment of the plug connector, the latter can have one or a plurality of inner conductor parts for connecting to one or a plurality of inner conductor parts of the cable.

The configuration having exactly one inner conductor part for connecting to an inner conductor of the cable is particularly suitable for a preferably provided configuration of the plug connector, in particular also as a FAKRA plug connector. A design embodiment of this type is also particularly suitable when the plug connector is provided for connecting to a coaxial cable.

The feature "plug body" in the context of the invention can include both one plug body as well as a plurality of plug bodies which are in each case assigned to one plug connector. Furthermore, the feature "inner conductor part" can define either only one inner conductor part or else a plurality of inner conductor parts which are connected to a corresponding number of inner conductors of a cable and are collectively assigned to one plug connector.

It is provided according to the invention that the housing has at least one receptacle for inserting the at least one plug body. In principle, the housing can be configured in such a manner that the latter has a plurality of receptacles for inserting a plurality of plug bodies. In one particularly preferred design embodiment, in particular when the housing is a so-called FAKRA housing, only one receptacle for inserting one plug body is provided. However, the invention is not limited thereto.

According to the invention, a contact element which is plug-fittable into the housing in such a manner that a front region of the contact element electrically contacts the plug body, inserted into the housing, on the external perimeter of said plug body is provided, wherein the contact element is connected in an electrically conducting manner to a fastening means so as to, independently of the cable, establish a ground connection to another component.

The assembly of the plug connection device is facilitated, and the functional reliability is increased, on account of this solution.

The solution according to the invention facilitates in a particularly simple manner a connection between the outer conductor of a cable and a ground link. To this end, the contact element contacts the plug body which is inserted into the housing and which according to the invention is connected to an outer conductor of a cable, and on account thereof establishes an electrical connection to the fastening means. It is no longer necessary for the cable jacket to be stripped outside the housing and for a ground terminal clamp to be crimped onto the braided shield of the cable in order for this connection to be established. The solution according to the invention enables the connection to be established within the housing without an additional cable-stripping procedure being required.

The solution according to the invention enables an outer conductor of a cable to be connected to a plug body. The plug body herein can have a connector region so as to connect a further plug, a cable, or the like, to the plug body. It is now additionally provided according to the invention that a contact element electrically contacts the plug body on the external perimeter thereof so as to establish an additional connection which is a ground connection to a further component. The further component can be a ground part, for example a vehicle ground (body, negative battery terminal, or similar).

The plug connector according to the invention for connecting the cable to a complementary or matching, respectively, plug connector can be provided on a connector region of the plug connector so as to, for example, connect the cable to an onward cable, or to connect the cable to a circuit board or to an electrical apparatus. The outer conductor of the cable, by way of the contact element that electrically contacts the external perimeter of the plug body, and by way of the fastening means, is additionally connected to the further component so as to achieve an additional ground connection.

The outer conductor of the cable can thus advantageously be electrically connected to the further component by way of the contact element or the fastening means, respectively. The electrical signal transmission quality can be improved on account of the ground connection. In particular, an improved shielding can be guaranteed, and the electrical connection can be improved overall.

On account of the contact element being plug-fittable into the housing of the plug connector and being configured for establishing the ground connection to the further component, a secondary securing feature can be combined with a ground connection. The secondary securing feature here in can be configured for indicating to an assembly technician the correct positioning of the plug body relative to the plug connector and/or relative to the housing of the plug connector, wherein the secondary security feature is preferably plug-fittable only in the case of a correct positioning. This can preferably be guaranteed in that a displacement path for plug-fitting the contact element is fully accessible only when the parts of the plug connector are mutually aligned, or are plugged into one another, respectively, in a corresponding manner.

The fastening means can be configured in an arbitrary manner. The fastening means can be configured in particular for establishing a simple ground connection, for example to the body of a vehicle or to another suitable component. The fastening means can be connected to a vehicle ground by way of, for example, a screw-fit or similar measures.

It is sufficient for the fastening means to be configured so as to establish a simple ground connection. It is not necessary for the fastening means per se to be fastened directly to the further component, for example to the body of a vehicle. It can be sufficient for the fastening means to serve for establishing an electrical connection between the contact element and the further component without per se being mechanically fastened to the further component.

In as far as a mechanical fastening of the plug connector being provided, this can optionally be performed by way of additional holders. However, in one design embodiment of the invention, it can be provided that the fastening means per se is already configured in such a manner that the fastening means can be mechanically fixed, or secured, respectively, directly or by way of fixing elements. Fixing or fastening, respectively, herein can be performed on or to the further component by way of which the ground connection is also established. However, the invention is not limited thereto. It can also be provided that the securing of the plug connector by way of the fastening means is performed on an arbitrary and optionally also non conducting construction element.

The plug connection device according to the invention is suitable for arbitrary plug connectors, in particular for the plug connectors already mentioned, and can preferably be used in all HSD plug connectors, FAKRA plug connectors and high-voltage plug connectors which have a metallic, in particular shielding, outer conductor.

It is advantageous for the front region of the contact element to be connectable in a form-fitting manner to at least part of the external perimeter of the plug body.

A good and reliable electrical contact is ensured by a form-fitting connection. Furthermore, a form-fitting connection additionally fulfills the task of a secondary security feature of the plug body in the housing, by way of which the connecting dimension can also be ensured.

It can be provided according to the invention that the contact element is inserted into the housing at an angle, preferably orthogonally to the longitudinal or axial axis, respectively, of the plug body, and is connected in a form-fitting manner to the plug body at an orthogonal alignment. A particularly suitable secondary securing feature is established on account thereof.

Connecting the plug body to the housing can, in principle, be performed in any arbitrary manner. However, it is particularly advantageous for the plug body to be plugged into the receptacle of the housing in the axial direction of the plug body. To this end, the receptacle can be preferably configured as a bore, in particular as an axial bore, in the housing. As a result thereof, a particularly advantageous secondary securing feature by way of the contact element can be established in the case of this type of the connection of the plug body to the housing, on account of which it is ensured by way of a minor effort that the plug body is no longer inadvertently, or in a self-acting manner, respectively, released from the housing, the connecting dimension in particular also being defined on account thereof.

The housing is preferably configured from plastics.

It is advantageous for the plug body and the receptacle to be designed in such a manner that a terminal position of the plug body is established in the receptacle of the housing.

A design of this type of the plug body and of the receptacle enables that the plug body is positioned in the housing before the contact element is plugged into the housing and preferably ensures a secondary securing feature.

The housing is preferably designed in such a manner that the plug body latches in the provided terminal position, to which end, for example, a snap-fit connection, in particular a snap-fit member or a snap-fit hook, respectively, is used which enables the plug body to be pushed in but prevents the latter being pulled back counter to the plug-in direction.

The housing, or the receptacle thereof, respectively, is preferably designed in such a manner that said housing or receptacle serves as the primary securing feature for the plug body. The primary securing feature herein is preferably designed so as to be releasable. The housing is preferably configured as a FAKRA housing which can already have a primary securing feature of this type.

It is advantageous for the plug connector to have a securing element which is capable of being incorporated in a cutout of the housing in such a manner that a movement of the housing in relation to the securing element is limited in at least one degree of freedom.

The securing element, just like preferably the contact element, can serve as a secondary securing feature which secures the plug body in the housing, or in the receptacle of the housing, respectively, as soon as said plug body has reached the provided terminal position.

The securing element is preferably offered up to the plug body at an angle, particularly preferably orthogonally to the axial direction of said plug body, on account of which a particularly advantageous securing feature results.

It is advantageous for at least part of the securing element to be located in a displacement path of the plug body incorporated in the housing.

In particular when the plug body by way of a movement along the axial axis of the former is pushed into a receptacle of the housing, it is particularly suitable for the securing element to be configured and to be incorporated in the housing in such a manner that part of the securing element is located in a displacement path of the plug body incorporated in the housing. This can be achieved in a particularly advantageous manner when the plug body has a diminution, a recess, a concavity, or an indentation into which at least part of the securing element can intrude so as to avoid that the plug body is pulled out again and/or is pushed in further into the receptacle.

Alternatively, albeit less suitably, the plug body can also have a protrusion or a convexity which is blocked by part of the securing element.

The securing element can have a latching hook or the like, which latches to a respective suitable recess of the housing such that the securing element is prevented from being pulled out again when the latter is pushed in so far that the securing element secures or fixes, respectively, the plug body. Alternatively, the housing can also have a latching hook, and the securing element can be configured in a corresponding manner. The receptacle, or the housing, respectively, can be configured in such a manner that the latching hook is releasable again in order for the securing element to be optionally removed again and for the plug body to be pulled out of the housing again, optionally upon additionally releasing the primary securing feature.

In one particularly advantageous design embodiment, the contact element, conjointly with the securing element, serves as a secondary securing feature for fixing and securing the plug body in the terminal position in the receptacle.

In order for the plug body to be secured it is particularly advantageous when the latter on the external perimeter thereof has a diminution in which the contact element and preferably also the securing element, or part of the securing element, respectively, engages. The diminution herein can be configured as an annular encircling diminution.

Depending on the design of the plug body, it can be provided that the latter has a construction in two parts or multiple parts. It can be provided in this case that a diminution which is used for the engagement of the contact element and/or of the securing element is configured at the connection point of two parts of the plug body.

In order for a particularly suitable connection to be established between the contact element and the plug body, at least the front region of the contact element can be configured as a terminal clamp. The terminal clamp herein can preferably have two terminal clamp arms which at least partially comprise the plug body on the external perimeter of the latter. The terminal clamp can be designed in such a manner that said terminal clamp has two subring-shaped terminal clamp arms, and the terminal clamp is pushed laterally, or from a radial direction, respectively, onto the external perimeter of the plug body. The terminal clamp is preferably designed in such a manner that said terminal clamp therebetween jams at least part of the external perimeter of the plug body and, on account thereof, fixes said plug body. The terminal clamp preferably comprises an annular portion of more than 180° of the external perimeter of the plug body.

Independently of the specific design of the contact element, but in particular in the case of a design embodiment of the contact element in such a manner that the front region is configured as a terminal clamp, it can be provided that the contact element is releasably connected to the plug body.

It is advantageous when the securing element is connected in a form-fitting manner to the contact element.

To this end it can be provided in particular that the securing element has a clearance and the contact element at least in the front region is configured as a terminal clamp. The terminal clamp herein can protrude through the clearance, wherein the contact element is pretensioned in such a manner that the contact element expands in the clearance and is thus connected in form-fitting manner to the clearance. It is particularly advantageous herein for the contact element to have a depression or a recess which is positioned in the region of the clearance, such that the periphery of the clearance of the securing element engages in the depression of the contact element and a form-fit is thus established.

The terminal clamp, instead of a recess, can also have a protrusion, and the clearance can be designed in a correspondingly complimentary manner.

The contact element and the securing element, upon being connected in a form-fitting manner, can be handled as one component. In this design embodiment it can be expedient for the electrically conducting connection between the contact element and the fastening means to be established by way of the securing element. In this case, the securing element is at least in part configured from metal, preferably entirely configured from metal.

The contact element and the securing element, respectively, can be connected, in particular in an electrically conducting manner, to the fastening means.

In one design embodiment it can be provided that the contact element is located in a clearance of the fastening means without any contact with the fastening means being performed. It can be provided in this design embodiment that the securing element is connected to the fastening means in an electrically conducting manner, at least when the contact element and the securing element are introduced into the housing in the manner envisaged, and the contact element electrically contacts the plug body. In this design embodiment, the securing element at least in part is configured so as to be electrically conducting, preferably by way of a configuration at least in part or entirely from metal. The connection between the securing element and the fastening means in this case can be performed in that the securing element is connected to the fastening means for example by a snap-fit connection, or by other means. However, in one design embodiment of the invention it is also possible for only the housing of the plug connector to be connected to the fastening means, for example likewise by way of a snap-fit connection, or other means, and for the securing element to be located between the housing and the fastening means. The fastening means in the contact region with the securing element can have, for example, a plate-shaped profile such that the securing element, after the fastening of the plug connector, or of the housing thereof, respectively, to the fastening means is jammed between the housing and the fastening means, in particular is connected to the fastening means in an electrically conducting manner. An electrically conducting connection between the plug body and the fastening means is thus established by way of the terminal clamp, or the contact element and the securing element, respectively, on account of the electrically conducting, preferably form-fitting connection, between the securing element with the contact element and, since the contact element electrically contacts the plug body.

A design embodiment of this type is particularly simple to implement and requires only simple assembly steps.

According to the invention it can also be provided that the contact element is inserted in a form-fitting manner in a clearance of the fastening means, or is configured so as to be integral to the fastening means.

In particular as an alternative to establishing an electrically conducting connection between the contact element and the fastening element by means of the securing element, it can also be provided that the contact element is connected directly to the fastening means, in particular in such a manner that an electrically conducting connection is established. To this end, the fastening element can have a clearance in which the contact element is inserted in the same manner as has already been described in the context of a potential connection of the contact element by way of a clearance of the securing element. On account thereof, a form-fitting and optionally releasable connection is established between the fastening means and the contact element. The connection can be rapidly and reliably established by way of simple measures. Alternatively, it can also be provided that the contact element is connected to the fastening means in another manner, for example by soldering/brazing, adhesive bonding, riveting, or the like. It can also be provided that the contact element is configured so as to be integral to the fastening means. The securing element can optionally be omitted in particular in the case of an integral configuration of the contact element and the fastening element.

In particular when the contact element is connected directly to the fastening means in an electrically conducting manner, a metallic configuration of the securing element can be dispensed with. In this design embodiment it is expedient for the securing element to be configured from plastics. In this design embodiment it is furthermore expedient for the securing element to have a passage for inserting the contact element and for connecting the front region of connecting the latter to the plug body.

It can be provided in this design embodiment that the securing element is first inserted in the housing, for example preassembled therein. Prior thereto or subsequently, the plug housing can be pushed into the receptacle of the housing up to the envisaged terminal position. Subsequently, the securing element can be pushed in further, preferably in the manner already described, until said securing element secures the position of the plug body in the receptacle and preferably serves as the secondary securing feature. The contact element thereupon can be inserted into the housing at an arbitrary location; the contact element is preferably inserted in a passage of the securing element in such a manner that the contact element is pushed in so far that the front region of said contact element is connected to the plug body.

It is expedient for the contact element prior thereto to be connected preferably in a form-fitting manner to the fastening means, and for the connection to the housing to be performed in that the housing is clip-fitted onto the contact element, and the housing is thus preferably attached to the fastening means, on the one hand, and the plug body is clip-fitted onto the contact element which in the front region is preferably configured as a terminal clamp, on the other hand.

Of course, connecting the securing element and the contact element to the housing can also be performed in another sequence.

The fastening means is preferably at least in part configured from metal, or from an electrically conducting material, respectively. The fastening means is preferably configured from metal.

The contact element is at least in part configured from an electrically conducting material, preferably at least in part from metal, particularly preferably entirely from metal. The contact element is preferably entirely configured in the form of a terminal clamp which preferably has resilient properties in order for the plug body to be reliably comprised on the external perimeter of the latter.

It is advantageous for the fastening means to have at least one support and/or at least one snap-fit connection part for fastening the housing of the plug connector. It is particularly advantageous for the fastening means to have both a support and a snap-fit connection part.

The snap-fit connection part can be configured, for example, as a snap-fit hook which snaps into a suitable counter element of the housing and fixes the housing to the fastening means at the envisaged position. Alternatively, the housing can also have one or a plurality of snap-fit hooks which engage on a suitable counter part of the fastening means. The support of the fastening means can be configured, for example, as a plate-shaped protrusion, optionally having a suitable peripheral protrusion for receiving in a defined manner, in particular for supporting, a lower side of the plug connector.

It can be provided in one refinement of the invention that the at least one snap-fit connection part intrudes at least partially into a groove in the outer side of the housing, so as to configure a form-fitting connection in the axial direction (or the plug-in direction, respectively) between the housing and the fastening means.

Two snap-fit connection parts are preferably provided in the manner of snap-fit hooks. The snap-fit hooks herein can at least in part, preferably completely, comprise the housing of the plug connector on two opposite outer sides. The snap-fit hooks can be designed in such a manner that said snap-fit hooks can be push-fitted over the external perimeter of the housing of the plug connector. Herein, the snap-fit hooks therebetween preferably jam part of the external perimeter of the housing of the plug connector, on account thereof (releasably) fixing the fastening means on the housing.

The fastening means can have at least one eyelet. The eyelet can be provided so as to establish a connection between the fastening means and a ground part, for example a vehicle ground. To this end, a screw can be pushed through the eyelet, for example, and the fastening means can be screw-fitted in a corresponding manner. Other connection possibilities are also conceivable here, in particular releasable connections in such a manner that the fastening means is readily releasable from the ground part. A low-resistance electrical ground connection is preferably established.

In one refinement of the invention it can be provided in particular that the fastening means has connection elements so as to establish, or configure, respectively, the ground connection to the further component. A connection element can also be the aforementioned eyelet.

The fastening means in one embodiment can also be configured from, or composed of, respectively, only the connection elements, or one connection element, respectively.

The fastening element can preferably be configured in such a manner that said fastening element has connection elements so as to establish a ground connection to the further component, or so as to enable said connection, respectively. The fastening means can particularly preferably be configured in such a manner that said fastening means has a design for fastening the fastening means to the housing in such a manner in particular that the fastening means is secured in a defined manner on the housing and, in particular in conjunction also with the securing of the contact element, a precise positioning of the fastening means on the housing results.

The fastening means can also be configured in such a manner that said fastening means has means so as to mechanically secure the fastening means on a further construction element, for example also on the further component. This is optional, however. The primary focus is not on mechanically securing the fastening means on a further component. In the context of the invention this can also be achieved by other means, if securing of the fastening means on a further construction element is provided in the first place. It is essential in the context of the invention that the contact element is connected in an electrically conducting manner to the fastening means, and the fastening means is configured so as to establish an electrically conducting connection between the contact element and a further component, wherein the connection is configured as a ground connection.

In a particularly preferred refinement, the connection elements can be configured as a crimp connection so as to connect a ground connector cable to the fastening means. On account thereof, the ground connection to the further component can be established or configured, respectively, in a simple manner.

The use of a ground connector cable as the electrical connection between the fastening means and the further component has proven to be particularly flexible in terms of handling. The ground connector cable herein can be electrically connected to a connector region of the fastening means in a mechanically robust manner by way of the crimp connection, for example by way of one, two, or more crimp terminal clamps. In order to be connected to the further component, or to a ground part, respectively, the ground connector cable at that end that is not connected to the fastening means can have, for example, an eyelet, a cable shoe, or the like, which in turn is for example crimp-fitted to the ground connector cable. The ground connector cable in this instance can be screw-fitted to the further component, for example, or can be plug-fitted on a connection location of the further component.

The ground connector cable can also be connected to the further component, or to the ground part, respectively, in another manner, for example by adhesive bonding, soldering/brazing, or clamping. The connection of the ground connector cable to the fastening means can also be performed by other means; for example, the connection elements can be configured as soldered connections, adhesive faces, and/or clamping faces.

In one preferred refinement it can be provided in particular that the fastening means, the at least one snap-fit connection part, the contact element, and the connection elements for the ground connection are integrally configured.

The fastening means having the aforementioned components is preferably configured as an integral metal sheet. The fastening means in this instance can be preferably made by punching and bending technology.

It can be provided in one refinement that the housing of the plug connector and the fastening means are configured in such a manner that the fastening means does not project beyond the outer side of the housing of the plug connector when said fastening means is inserted in the housing of the plug connector.

In particular when the fastening means is configured as a metal sheet, the latter can extend so as to bear tightly along the external perimeter of the housing of the plug connector (preferably so as to be co-planar with the assigned outer sides of the housing, or so as to be recessed in relation to the assigned outer sides of the housing). The plug connector can thus have a compact construction, and the fastening means can be protected from damage.

It is advantageous for the fastening means to be configured for fastening and electrically contacting a plurality of plug connectors.

Electrical contacting herein can be performed by way of the contact elements which can be part of the fastening means or are connectable to the latter in the manner already described.

The plug connectors can preferably be insertable in the fastening means, or be connectable to the latter, respectively, so as to be parallel beside one another.

In one design embodiment of the fastening means for receiving a plurality of plug connectors, it can be advantageous for two or more connection possibilities, in particular eyelets, to be present for fastening a fastening means to a ground part, for example a vehicle ground.

The contact element according to the invention, in particular in combination with the securing element, can advantageously both assume the task of the secondary securing feature, or of securing in general, respectively, and herein also can ensure the connecting dimension, and establish a connection between the outer conductor of the cable with a ground part. When the plug connection device according to the invention is used in a vehicle, the ground part can be a vehicle ground, in particular for establishing an indirect electrical connection to a negative terminal of a vehicle battery.

The plug connector according to the invention can be provided in particular for connecting to a data transmission cable, in particular for high-frequency applications.

Exemplary embodiments of the invention will be illustrated in principle hereunder by means of the drawing.

The figures show in each case preferred exemplary embodiments in which individual features of the present invention are illustrated in combination with one another. The features of one exemplary embodiment are also implementable independently of the other features of the same exemplary embodiment, and can accordingly be combined by a person skilled in the art with features of other exemplary embodiments so as to form further purposeful combinations.

DETAILED DESCRIPTION OF PREFERRED EMBODIMENTS

A plug connection device according to the invention in the exemplary embodiments is illustrated by means of a so-called FAKRA standardization scheme, wherein only those features that are essential to the invention are illustrated in more detail hereunder. Potential embodiments and variants are derived from DIN 72594.

However, the present invention and also the exemplary embodiment illustrated are not to be understood as being limited to a FAKRA plug connector or to a FAKRA housing, respectively. The solution according to the invention is suitable for arbitrary plug connectors.

The features of FIGS. 1 to 14 illustrated hereunder can be combined with one another in an arbitrary manner in as far as this is not technically excluded.

Figure 12:
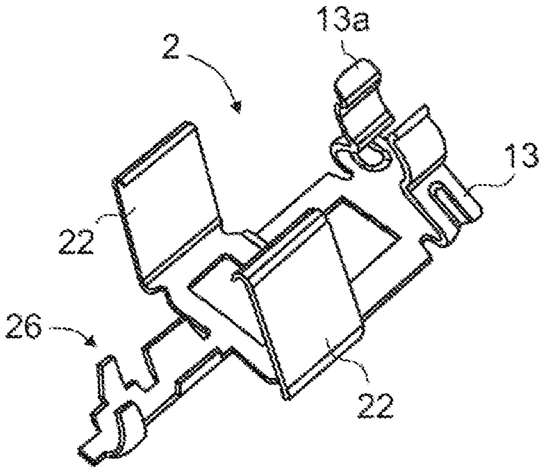
FIG. 12 shows a particularly preferred embodiment of an integral fastening means.
Figure 13:
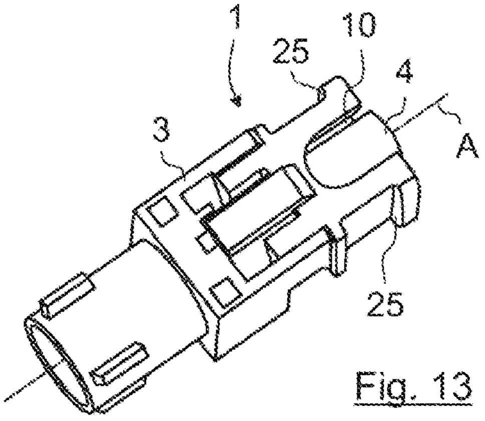
FIG. 13 shows a particularly preferred embodiment of a plug connector for use with the integral fastening means according to FIG. 12.
Figure 14:
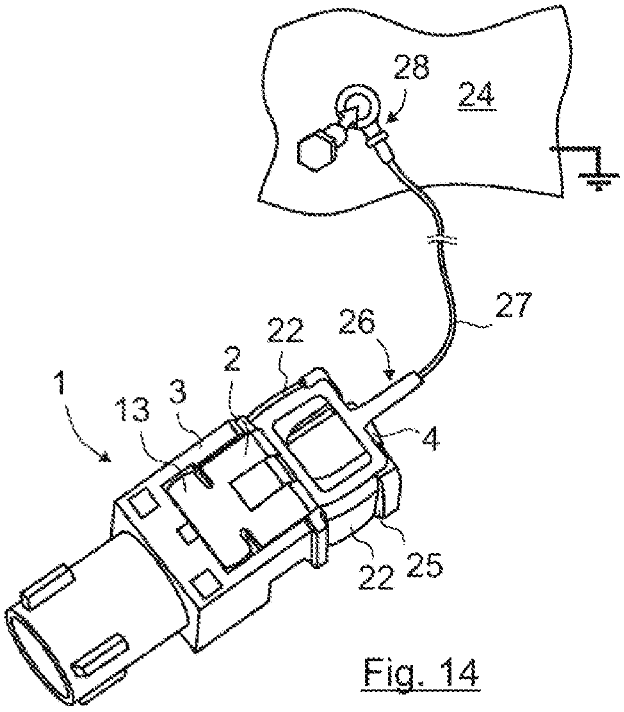
FIG. 14 shows the particularly preferred plug connector of FIG. 13 having an inserted fastening means according to FIG. 12.

The invention is implementable in different variants. Two variants are illustrated in an exemplary manner in the exemplary embodiment. FIGS. 1 to 11 herein show a first variant in which the fastening means 2 and the contact element 13 are configured so as to be mutually separate and capable of being plugged into one another. The fastening means 2 in these Figures is furthermore configured in such a manner that the fastening means can be mechanically secured on a further construction element/component. FIGS. 12 to 14 show a particularly preferred variant of the invention, according to which the fastening means 2 is configured so as to be integral to the contact element 13. No means for mechanically securing the fastening means 2 on a further (arbitrary) construction element are configured on the fastening means 2 in FIGS. 12 to 14. This is, however, also possible in principle. Although an integral configuration of the fastening means 2 and the contact element 13 is shown in FIGS. 12 to 14, this is not mandatory. The fastening means 2 and the contact element 13 can also be configured as independent elements and only electrically and preferably also mechanically connected to one another.

Figure 1:
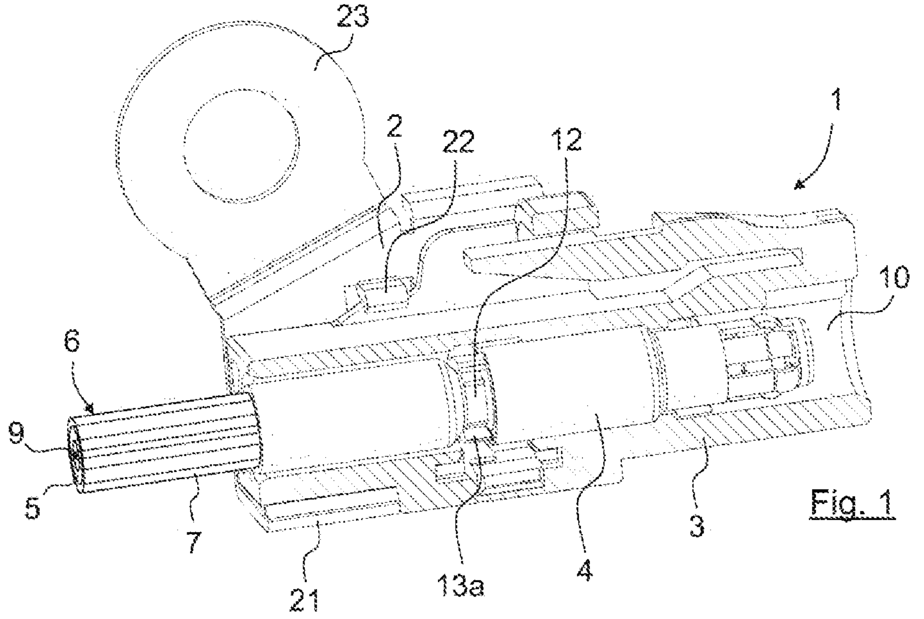
FIG. 1 shows a perspective illustration of an embodiment of plug connection device according to the invention, having a vertically running longitudinal section through a housing of the plug connector, wherein a plug body is illustrated without being sectioned.

FIG. 1 shows a vertical longitudinal section through the plug connection device according to the invention, having a plug connector 1 and a fastening means 2.

The plug connector 1 has a housing 3 which is also illustrated in more detail in FIGS. 2 to 4, and 8 to 11. This, herein, can be a so-called FAKRA housing of a plug connector 1.

FIGS. 13 and 14 show a variant of the housing 3 which deviates somewhat therefrom, but which is preferably likewise configured so as to be compatible with the FAKRA standardization scheme.

The housing 3 is preferably configured from plastics.

The plug connector 1 furthermore has a plug body 4 which is connected to an outer conductor 5 of a cable 6 that in FIG. 1 is illustrated in only a schematic manner. Connecting the plug body 4 to the outer conductor 5 can be performed by way of known measures, for example by soldering/brazing, adhesive bonding, clamping, or crimping. In the exemplary embodiment it is provided (not shown in more detail in the drawing), that the plug body 4 is crimp-fitted to the outer conductor 5. To this end, the plug body 4 can optionally also be configured in multiple parts; at least one part of the plug body 4 is preferably configured so as to be crimp-fitted to the outer conductor 5. This can be preferably performed in that a cable jacket 7 of the cable 6 is stripped so far that the outer conductor 5, which can preferably be a braided shield, is exposed. The plug body 4 can then be crimp-fitted to this braided shield. To this end, it can optionally be provided that a support sleeve (not illustrated) is first crimp-fitted to the outer conductor 5, in particular to the braided shield, and the braided shield is subsequently folded back over the support sleeve, and part of the plug body 4, or a connection piece for connecting to the plug body 4, or the plug body 4 in an integral manner, is only then crimp-fitted to the folded-back outer conductor 5, or is connected to the latter by other means.

The plug connector 1 furthermore has at least one inner conductor part 8 (cf. FIG. 4) which is provided for connecting to an inner conductor 9 of the cable 6. Connecting herein can be performed, for example, by soldering/brazing, adhesive bonding, clamping, or crimping. It is provided in the exemplary embodiment that the inner conductor part 8 is crimp-fitted to the inner conductor 9 of the cable 6. The inner conductor part 8 is connected to the inner conductor 9 of the cable 6 preferably once the outer conductor 5 of the cable 6 has been exposed and preferably folded back, and before the plug body 4 is crimp-fitted to the outer conductor 5. In order for the inner conductor part 8 to be fastened on the inner conductor 9, the latter can first be stripped, which can be performed by way of known measures.

Figure 4:
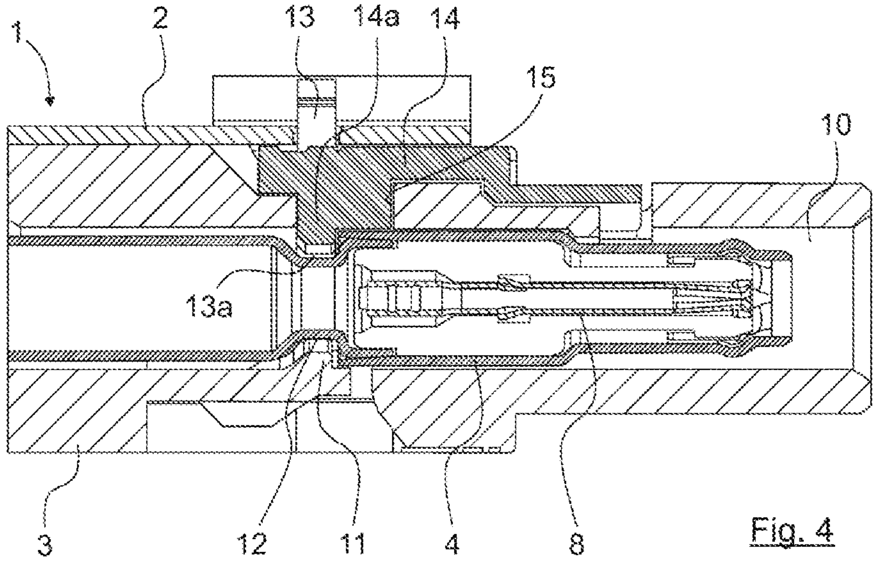
FIG. 4 shows a horizontal longitudinal section through a plug connection device according to FIG. 1.
Figure 5:
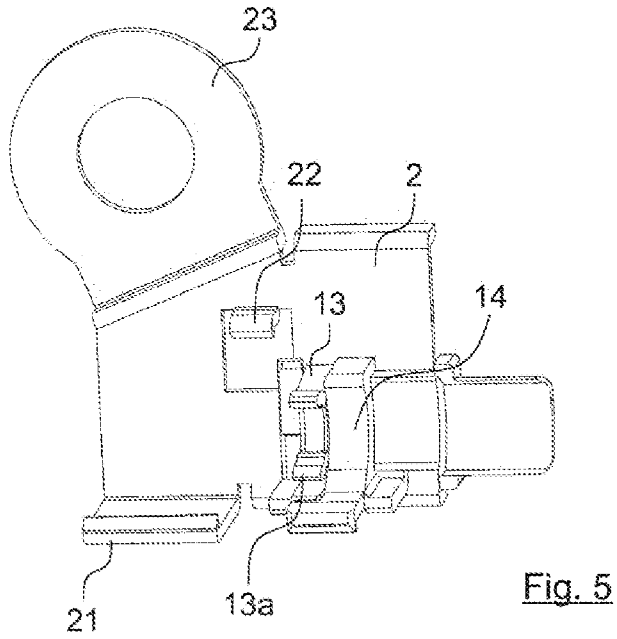
FIG. 5 shows a plan view from the front of a fastening means having a contact element and a securing element.
Figure 6:
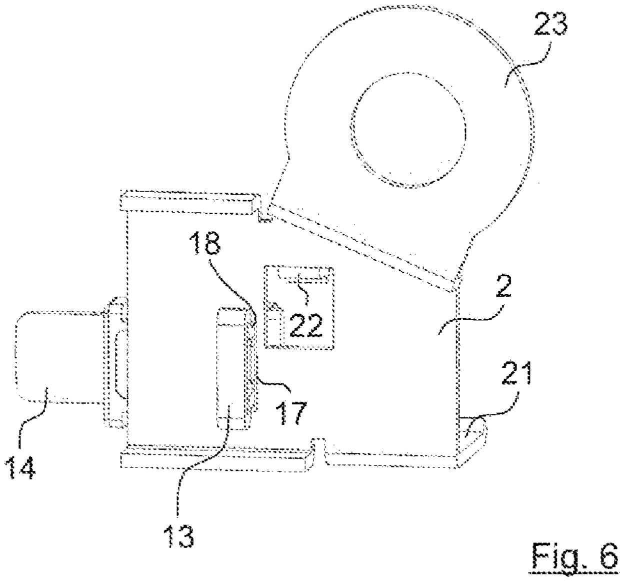
FIG. 6 shows an illustration of FIG. 5 from the rear.

FIG. 4, in a sectional and exemplary manner, shows the profile and the arrangement of the inner conductor part 8 within the plug body 4. When viewed together with FIG. 1, it is illustrated herein how the plug connector 1 provides a connector for attaching another complementary plug connector (not illustrated) and for electrically connecting the latter to the inner conductor part 8 and to the plug body 4.

In the case of the plug connector 1 illustrated in FIGS. 13 and 14, the connection to the outer conductor 5 of the cable 6 (not shown therein) and the connection of the inner conductor 9 of the cable 6 to the inner conductor part 8 can in principle be provided in a similar or identical manner.

It is illustrated in the exemplary embodiment that the plug body 4 receives a single inner conductor part 8. Of course, the plug body 4 can also receive a plurality of inner conductor parts 8 which are connected to a corresponding number of inner conductors 9.

It is furthermore illustrated in the exemplary embodiment that the plug connector 1 receives one plug body 4. It can in principle also be provided that the plug connector 1 receives a plurality of plug bodies 4. The exemplary embodiment is to be understood in an analogous manner.

As can be seen from the Figures, in particular from FIGS. 1, 4, 8, and 13, the housing 3 has a receptacle 10 for inserting the plug body 4. The receptacle 10 in the exemplary embodiment is configured as a bore which extends axially through the housing 3. It is furthermore provided in the exemplary embodiment that the plug body 4 is plugged into the housing 3 or the receptacle 10 of the housing 3, respectively, by a movement along the longitudinal axis of said plug body 4, or in the axial direction A, respectively, (cf. FIG. 13). The plug body 4 and the receptacle 10 herein are designed in such a manner that a terminal position of the plug body 4 in the receptacle 10 is established. In order for the terminal position to be established it is preferably provided that the plug body 4 in the terminal position thereof latches into the receptacle 10 in a perceivable manner. To this end, it is provided in the exemplary embodiment that the housing 3 has at least one latching element 11 (cf FIG. 4) which when pushing in the plug body yields laterally or radially, respectively, and admits the plug body 4 but, when reaching the terminal position of the plug body 4, returns, preferably springs back, to the previous or non-deflected position, respectively, of said latching element 11 preferably in such a manner that the latching element 11 blocks the path of the plug body 4 when the latter is pulled back counter to the push-in direction. The latching element 11 can preferably be designed in such a manner that the latter is operable and thus can optionally be deflected, for example by pushing in a screwdriver, so as to enable a retrieval of the plug body 4 from the housing 3, or from the receptacle 10, again when required.

The plug body 4 preferably has a diminution 12 into which the latching element 11 intrudes when the plug body 4 has reached the terminal position thereof in the receptacle 10. This, herein, can also be an arbitrary recess, depression, or the like. However, the configuration of a preferably annularly encircling diminution 12 has proven to be particularly suitable. The diminution 12 can also be produced, for example, in that the plug body 4 has a construction in two or multiple parts, wherein the diminution 12 is preferably configured in the connection region between two parts of the plug body 4.

It can be provided in the exemplary embodiment that the receptacle 10 and the plug body 4 have mechanical coding features such that the plug-fitting of a plug body 4 that is not intended for the housing 3 is mechanically prevented.

According to the invention, a contact element 13 which is plug-fittable in the housing 3 in such a manner that a front region 13*a* of the contact element 13 electrically contacts the plug body 4, inserted into the housing 3, on the external perimeter of said plug body 4 is provided. The contact element 13 herein is connected in an electrically conducting manner to the fastening means 2. On account thereof, a ground connection to a further component 24 (cf FIG. 14), for example to a conductive body part of a vehicle, can be established independently of the cable 6. The front region 13*a* of the contact element 13, the former comprising the external perimeter of the plug body 4, is particularly well illustrated in FIGS. 1, 7, and in FIG. 12. FIG. 4 in the horizontal longitudinal section illustrated, shows only a short portion of the front region 13*a* of the contact element 13, the latter otherwise being obscured by the plug body 4 illustrated in the section.

FIGS. 5, 7, 9, 10, and 12 show the contact element 13, in particular the front region 13*a* of the contact element 13, without the plugged-in plug body 4.

A connection of the contact element 13 to the fastening means 2 can be derived in particular from FIGS. 2, 6, 7, 9, 10, and 11.

In the variant of FIGS. 12 to 14, however, the contact element 13 is preferably configured so as to be integral to the fastening means 2, as has already been mentioned.

The front region 13*a* of the contact element 13 in the exemplary embodiment is connected in a form-fitting manner to at least part of the external perimeter of the plug body 4. The front region 13*a* of the contact element 13 herein is configured as a terminal clamp 13*a*. The terminal clamp 13*a* herein has two terminal clamp arms which are preferably configured so as to be sprung and, for connecting to the external perimeter of the plug body 4, are deflected from the de-stressed position of said terminal clamp arms, and upon connecting to the external perimeter of the plug body 4 spring back again as far as possible, and thus therebetween receive or comprise, respectively, the plug body 4.

The contact element 13 can contact the plug body 4 in principle at any arbitrary position. In the exemplary embodiment it is provided that the contact element 13, or the terminal clamp 13*a* thereof, engages in the diminution 12 of the plug body 4. The latching element 11 in the exemplary embodiment also engages in the same diminution 12, but this is not mandatory. These here can also be different diminutions, depressions, recesses, or the like. However, the use of a common diminution 12 can be advantageous in terms of construction and thus in terms of economy.

It is provided in the exemplary embodiment that the contact element 13 is positioned in the housing 3 in such a manner that the contact element 13 engages in the diminution 12 when the plug body 4 has reached the terminal position thereof, on account of which a connecting dimension of the plug body 4 is also ensured.

As can be furthermore seen from FIGS. 1 to 11, the plug connector 1 in this variant has a securing element 14 which is capable of being incorporated in a clearance 15 (cf. FIG. 4 and FIG. 8) of the housing 3 in such a manner that a movement of the housing 3 in relation to the securing element 14 is limited in at least one degree of freedom. The limitation of the movement of the housing 3 in relation to the securing element 14 in at least one degree of freedom, preferably at least in the movement direction for pushing the plug body 4 in and out, is particularly advantageous when the securing element 14 is secured on the fastening means 2 directly and/or by way of the contact element 13. In this case, a movement of the housing 3 in relation to the fastening means 2 is already limited by the securing element 14, preferably at least in the mentioned movement direction, or the longitudinal direction, or the axial direction A of the housing 3, respectively.

The securing element 14 and the clearance 15 of the housing 3 are preferably designed in such a manner that the housing 3 in relation to the securing element 14 in terms of the movement of said housing 3 is also limited in further degrees of freedom. It can furthermore be provided that the securing element 14, when the latter is fully pushed into the clearance 15, latches in the provided terminal position in the housing 3. To this end, a latching hook can be provided. The latching hook can preferably be releasable so as to retrieve the securing element 14 from the clearance 15, or from the housing 3, respectively, again.

By receiving the securing element 14 in a substantially form-fitting manner in the clearance 15 and the latching hooks, it can be provided that the securing element 14 and the housing 3 are interconnected so as to be substantially immovable.

As can be derived in particular from the illustration of FIG. 4, at least part 14*a* of the securing element 14 protrudes into a displacement path of the plug body 4 incorporated in the housing 3. In the exemplary embodiment herein, part 14*a* of the securing element 14 protrudes into the diminution 12 such that pulling the plug body 4 out of the housing 3, or out of the receptacle 10, respectively, again is blocked by the part 14*a*.

It is illustrated in the exemplary embodiment that both the contact element 13 and the securing element 14 are connected to the plug body 4 by way of an orthogonal movement.

The contact element 13 and also the securing element 14 thus extend orthogonally in the direction toward the plug body 4 when the latter is inserted in the terminal position in the housing 3.

The part 14*a* of the securing element 14, as also the terminal clamp 13*a* and the latching element 11, protrudes into the same diminution 12; this is, however, optional.

As can be seen in particular from FIGS. 2, 6, 9, and 10, the contact element 13 in the variant of FIGS. 1 to 11 is inserted in a form-fitting manner in a clearance 17 of the fastening means 2. Alternatively, the contact element 13 can also be connected to the fastening means 2 in any arbitrary manner, for example by soldering/brazing, adhesive bonding, or riveting. The contact element 13 can also be configured conjointly with the fastening means 2 as one part or so as to be integral to the latter, respectively. An integral configuration is shown in the variant of FIGS. 12 to 14.

A good mechanical and electrically conducting connection between the contact element 13 and the fastening means 2 is established by the form-fitting connection illustrated in the exemplary embodiment.

The fastening means 2 and also the contact element 13 in all exemplary embodiments are preferably configured so as to be at least in part electrically conducting; the fastening means 2 and also the contact element 13 are preferably at least in part formed from an electrically conducting metal. The fastening means 2 and/or the contact element 13 are/is preferably formed substantially entirely, particularly preferably entirely, from metal.

Figure 2:
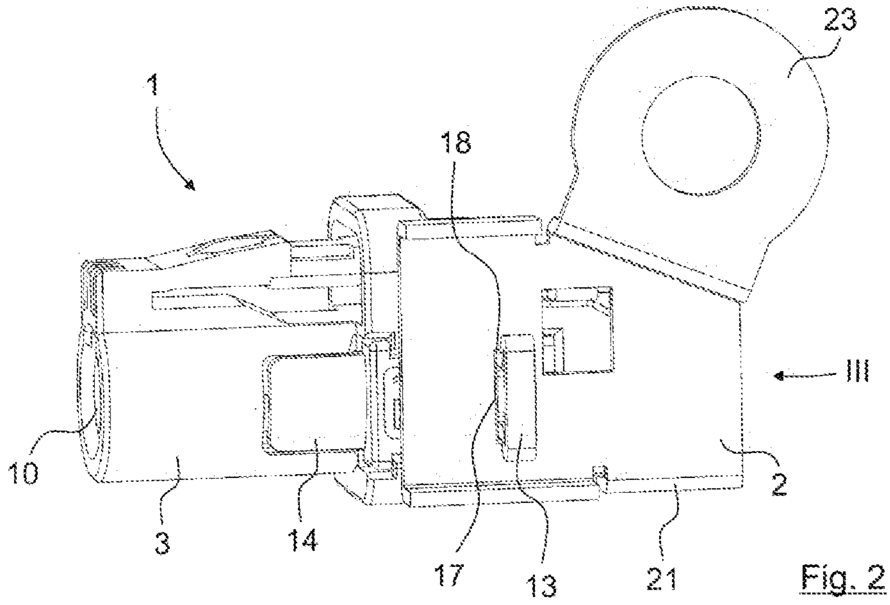
FIG. 2 shows a rear view of the plug connection device according to FIG. 1.
Figure 3:
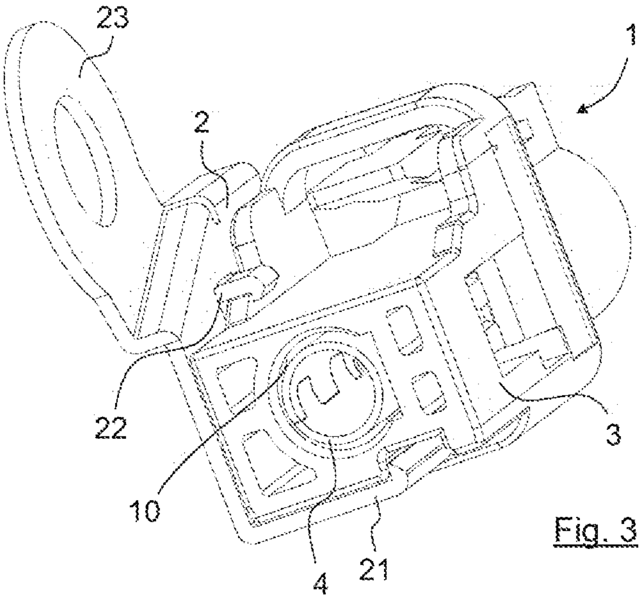
FIG. 3 shows a perspective view of the plug connection device viewed from the direction of the arrow III of FIG. 2.

The form-fitting connection of the contact element 13 to the clearance 17 of the fastening means 2 can be particularly advantageously established in that the contact element 13 is configured so as to be sprung and has a diminution 18 in which the periphery of the clearance 17 engages, so as to fix the contact element 13 in the clearance 17. The contact element 13, as is illustrated in the exemplary embodiment according to FIGS. 1 to 11, preferably has a design embodiment having two terminal clamp arms which run in a mutually mirror-symmetrical manner and in each case have one diminution 18 in which the periphery of the clearance 17 engages, such as can be seen in FIG. 2.

Alternatively, the contact element 13 can also have a protrusion, and the clearance 17 can be configured in a correspondingly complementary manner in order for a form-fitting connection to be established.

Figure 8:
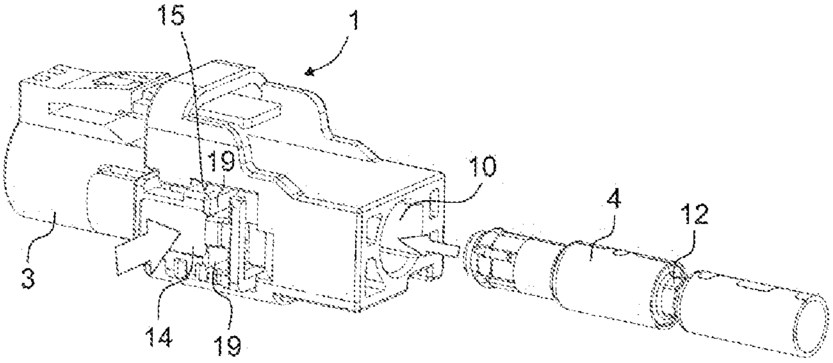
FIG. 8 shows an illustration of a potential assembly of a plug body and of a securing element in a housing of the plug connector.
Figure 9:
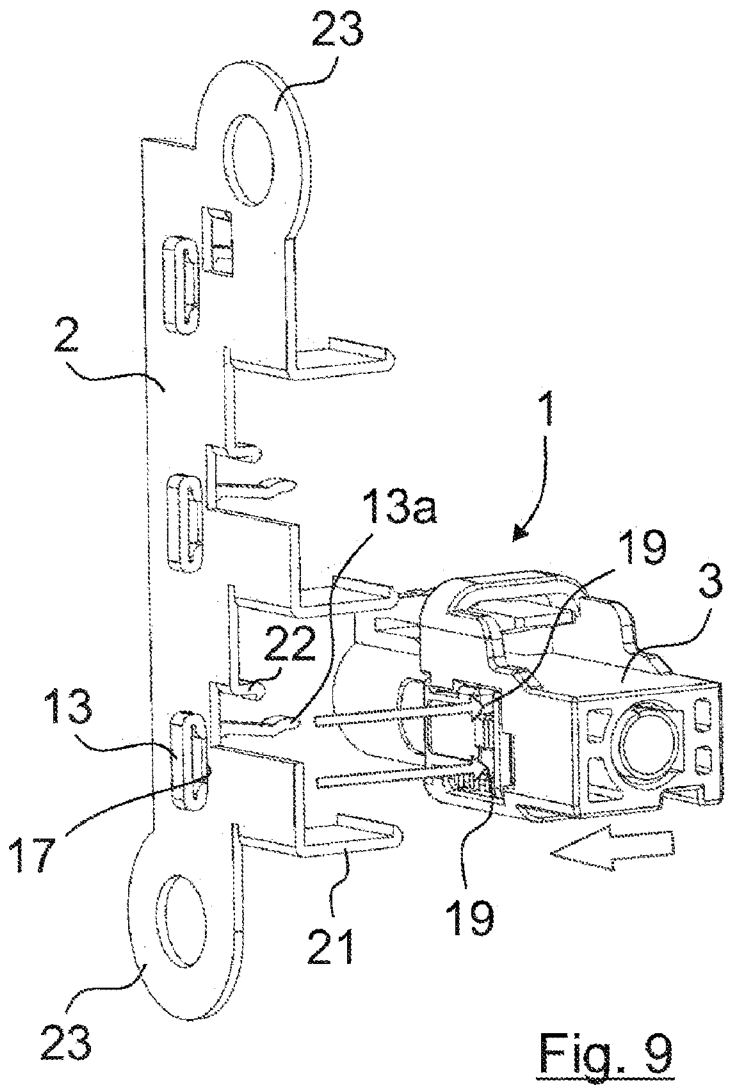
FIG. 9 shows a perspective illustration from the rear of a fastening means for fastening and electrically contacting a plurality of plug connectors.

As can be derived in particular from FIG. 8 and FIG. 9, the securing element 14 can have a passage 19 for inserting the contact element 13 and for connecting the front region of the latter, that is to say the terminal clamp 13*a*, to the plug body 4. This has the advantage that the housing 3 does not have to have any additional clearance for admitting the contact element 13, but the passage 19 can be configured in a simple manner in the securing element 14 which is anyway already located in a clearance 15 of the housing 3. The contact element 13 is thus plugged into the housing 3 in the context of the invention on account of the presence of the passage 19 in the securing element 14.

The passage 19 in the exemplary embodiment according to FIGS. 1 to 11 is configured in two parts, such that one passage is achieved for each terminal clamping arm of the contact element 13.

The securing element 14 in this embodiment is preferably configured from plastics. The securing element 14 in this embodiment is preferably not electrically conducting.

Figure 7:
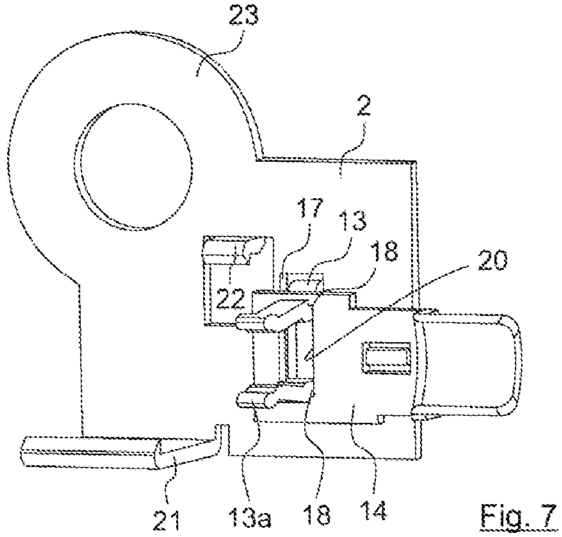
FIG. 7 shows a plan view from the front of a fastening means having a contact element and a securing element, in a second embodiment.

FIG. 7 shows an alternative design embodiment of the securing element 14. A relatively flat configuration of the securing element 14 is illustrated in FIG. 7, but this is presently not the primary focus. The exemplary embodiment of FIG. 7 differs from the previously described exemplary embodiment substantially in that the contact element 13 is inserted in a clearance 20 of the securing element 14. The contact element 13 herein can be designed in the manner as has been described already in the exemplary embodiment, wherein in this case a periphery of the clearance 20 of the securing element 14 engages in the diminution 18 of the contact element 13, or in the terminal clamp arms of the latter that run in a mirror-symmetrical manner, respectively, so as to receive in a form-fitting manner the contact element 13 in the clearance 20.

No direct connection between the contact element 13 and the fastening means 2 is provided in the exemplary embodiment illustrated in FIG. 7. The electrical connection between the contact element 13 and the fastening means 2 in the exemplary embodiment according to FIG. 7 is performed by way of the securing element 14. The securing element 14 to this end is configured so as to be at least in part electrically conducting, preferably at least in part from metal, particularly preferably substantially or entirely from metal. The contact element 13 can be loosely positioned in a clearance 17 of the fastening means 2. It can be provided that the securing element 14 is connected to the fastening means 2, for example, by a snap-fit connection. However, the connection can also be performed in another manner. In principle, a fixed connection between the securing element 14 and the fastening means 2 can also be completely dispensed with. This is possible in particular when the housing 3 is connected to the fastening means 2 in such a manner that the securing element 14 is jammed between the housing 3 and the fastening means 2 and, on account thereof, is fixed accordingly.

In principle, the securing element 14 in the exemplary embodiment according to FIG. 7 can also be inserted in a clearance 15 of the housing 3 in such a manner that a movement of the housing 3 in relation to the securing element 14 is limited in at least one degree of freedom. The securing element 14 in the embodiment according to FIG. 7 herein can also be designed in such a manner that said securing element 14 has a part 14*a* which intrudes into a displacement path of the plug body 4 incorporated in the housing 3, when the securing element 14 is positioned accordingly.

As can be seen from FIGS. 1 to 11, the fastening means 2 can have a support 21 and/or at least one snap-fit connection part 22 for fastening the housing 3 of a plug connector 1. In the exemplary embodiments of the variant of FIGS. 1 to 11, both a support 21 on which a lower side of the housing 3 can be supported, and a snap-fit connection part 22 which in the exemplary embodiment is configured as a snap-fit hook, are provided. The support 21 herein can have a securing edge so as to in particular additionally delimit a horizontal movement of the housing 3.

The fastening means 2 can furthermore have at least one eyelet 23 or else a plurality of eyelets 23 which can be provided for electrically and mechanically connecting the fastening means 2 to a ground part, or to the further component 24, for example a vehicle ground or the like.

Figure 10:
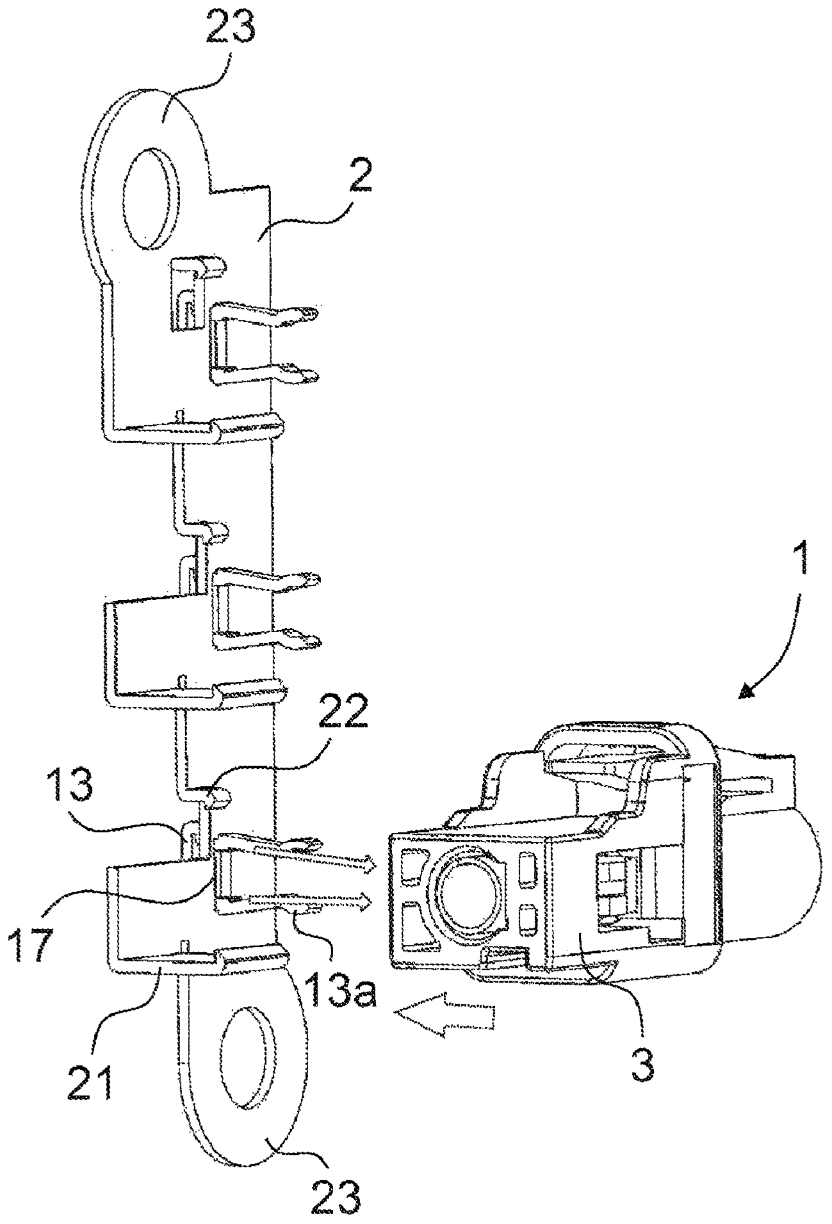
FIG. 10 shows a perspective illustration from the front of a fastening means according to FIG. 9.
Figure 11:
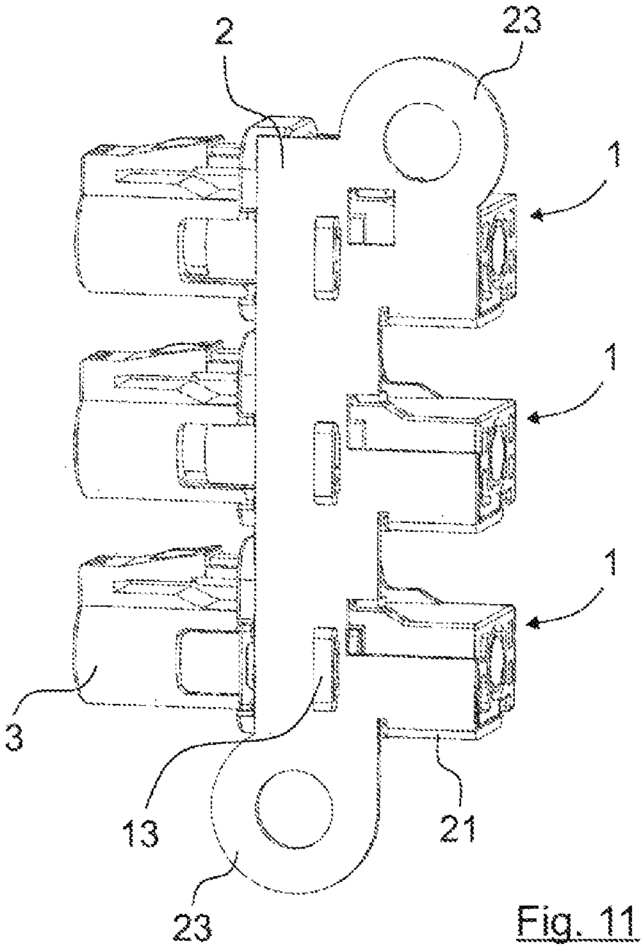
FIG. 11 shows an illustration from the rear of a fastening means for fastening and electrically contacting a plurality of plug connectors.

FIGS. 9 to 11 show a design embodiment of the fastening means 2 for receiving and fastening and for electrically contacting a plurality of plug connectors 1. Three plug connectors 1 are illustrated in the exemplary embodiment; however, the invention is not limited to the specific number of plug connectors 1 which a fastening means 2 can receive. In the exemplary embodiments according to FIGS. 9 to 11, the fastening means 2 has two eyelets 23. Alternatively, only one or a plurality of eyelets 23 can also be provided. Furthermore, the design of the eyelets 23, or the presence of the latter, is optional in the case of all fastening means 2. The eyelets 23 can optionally be entirely omitted; however, it is advantageous for the fastening means 2 to have connection elements in order for the fastening means 2 to be attached in a simple manner to a ground part, or to the further component 24, respectively.

As can be derived from the exemplary embodiments relating to the variant of FIGS. 1 to 11, securing the plug body 4 can be performed by a corresponding design of the housing 3, in particular by the latching element 11, as long as the securing element 14 and the contact element 13 have not yet been offered up to the plug body 4. This is referred to as a primary securing feature.

After the securing element 14 and/or the contact element 13 have been pushed into the terminal positions thereof, the plug body 4 that has previously been positioned in the housing 3 can be secured by said securing element 14 and/or said contact element 13. This is referred to as a secondary securing feature, wherein an interaction of the contact element 13 and of the securing element 14 is particularly expedient to this end. The contact element 13 and the securing element 14 herein can also be responsible for the positionally accurate seat of the plug body 4 in the housing 3, and can thus also ensure the connecting dimensions for connecting to a complementary plug connector (not illustrated in more detail).

FIG. 8 shows the securing element 14 in a so-called pre-latching position. The securing element 14 is preferably preassembled in the housing 3. In order for the plug body 4 to be assembled, it is provided herein that the plug body 4 is first plugged into the housing 3 and subsequently, when the plug body 4 has reached the terminal position thereof in the housing 3, the secondary securing feature 14 is pushed in up to the terminal latching position of the latter.

As is illustrated in an exemplary manner in FIGS. 9 and 10, the plug connector 1 can subsequently be clip-fitted onto the contact element 13 which is already connected to the fastening means 2.

A securing element 14 can be dispensed with in the variant shown in FIGS. 12 to 14.

FIG. 12 shows a particular variant of the fastening means 2, said variant being preferred in principle. FIG. 13 shows a housing 3 suitable for this variant, and FIG. 14 illustrates the fastening means 2 and the housing 3 in an assembled position. All features described above can herein of course be combined with the features of this variant, in as far as this is not technically excluded.

The fastening means 2 of this variant likewise has a contact element 13 which now, however, is preferably configured so as to be integral to the fastening means 2. Two snap-fit connection parts 22 for fastening the housing 3 of the plug connector 1 are furthermore provided, said snap-fit connection parts 22 to this end encompassing the housing 3 on the outer side thereof. The housing in the outer side thereof has a groove 25 into which the snap-fit connection parts 22 can intrude so as to configure a form-fitting connection in the axial direction A between the housing 3 and the fastening means 2. The snap-fit connection parts 22 are also preferably configured so as to be integral to the fastening means 2. It can also be provided that the snap-fit connection parts 22 are configured as arbitrary connection elements and in particular in such a manner that said snap-fit connection parts 22 intrude into the housing 3 and, on account thereof, establish a mechanical, in particular form-fitting and/or force-fitting, connection between the fastening means 2 and the housing 3.

The fastening means 2 finally has connection elements 26 so as to configure the ground connection to the further component 24. The connection elements are presently configured as a crimp connection 26 and are likewise preferably integral to the fastening means 2.

A ground connector cable 27 for configuring the ground connection to the further component 24 (cf. FIG. 14) can preferably be crimp-fitted to the fastening means 2 by way of the crimp connection 26. To this end, the ground connector cable 27, at that end that is not crimp-fitted to the fastening means 2, can preferably have a cable shoe 28 (or the like) for the electrical and mechanical fastening to the further component 24.

The fastening means 2, in particular according to the variant of FIGS. 12 to 14, can preferably be configured as a thin metal sheet. The fastening means 2 can be configured as a punched and bent part.

The housing 3 of the plug connector 1 and the fastening means 2 are preferably configured in such a manner that the fastening means 2 does not project beyond the outer sides of the housing 3 of the plug connector 1, preferably being recessed, when said fastening means is inserted in the housing 3 of the plug connector 1. The housing 3 to this end can have suitable depressions and/or recesses, as can be seen in FIGS. 13 and 14.

While the invention has been described with reference to various preferred embodiments, it should be understood by those skilled in the art that various changes may be made and equivalents substituted for elements thereof without departing from the scope of the invention. In addition, many modifications may be made to adapt to a particular situation or application of the invention without departing from the scope of the invention. Therefore, it is intended that the invention not be limited to the particular embodiments disclosed but rather, that the invention will include all embodiments falling within the scope of the appended claims, either literally or under the Doctrine of Equivalents.

What is claimed is:

1. A plug connection device for connecting to an electrical cable of the type having an outer conductor and at least one inner conductor and for establishing a ground connection between the outer conductor and a component external to the plug connection device by way of a ground cable which is electrically connectable between the plug connection device and the component, said plug connection device comprising:

(a) at least one plug connector, each plug connector including (i) a plug body which is electrically and mechanically connectable to the outer conductor of the electrical cable, the plug body having an external perimeter;

(ii) an inner conductor part which is electrically and mechanically connectable to the inner conductor of the electrical cable, and (iii) a housing having an outer side which includes a groove, the housing also having a receptacle which receives the plug body in an axial direction; said plug connection device further comprising (b) fastening means electrically and mechanically connectable to the plug connector for establishing the ground connection by way of the ground cable, the fastening means having a snap-fit connection part, a contact element and a connection element, the snap-fit connection part, the contact element and the connection element being configured integrally with one another, the contact element and the connection element being electrically connected with one another; the snap-fit connection part intruding at least partially into the groove of the outer wall of the housing in a form fitting manner to mechanically connect the fastening means to the housing of the plug connector in the axial direction, the contact element having a region which plugs into the housing and makes electrical contact with the external perimeter of the plug body, the connection element being connectable to the ground cable to establish the ground connection independently of the electrical cable, the ground connection being established via the plug body, the contact element, the connection element and the ground cable.

2. A plug connection device as claimed in claim 1, wherein the connection element comprises a crimp connector which is electrically and mechanically connectable to the ground cable.

3. A plug connection device as claimed in claim 1, wherein the region of the contact element which plugs into the housing and makes electrical contact with the external perimeter of the plug body comprises a terminal clamp.

4. A plug connection device as claimed in claim 1, wherein the fastening means does not project beyond the outer sides of the housing of the plug connector when the fastening means is fully inserted into the housing of the plug connector.

5. A plug connection device as claimed in claim 1, wherein the at least one plug connector comprises a plurality of plug connectors and the fastening means is a single fastening means which is mechanically connected to, and supports, the plurality of plug connectors and wherein the contact element of each of the plurality of the plug connectors is electrically conductively connected in common to the single fastening means.

6. A plug connection device as claimed in claim 1, wherein the region of the contact element which plugs into the housing is a front region which is connectable to at least part of the external perimeter of the plug body in a form-fitting manner.

7. A plug connection device as claimed in claim 6, wherein a terminal position of the plug body in the receptacle is established by the plug body and the receptacle.

8. A plug connection device as claimed in claim 6, wherein the external perimeter of the plug body includes a diminution which the contact element engages.

9. A plug connection device as claimed in claim 1, wherein the plug connector incudes a securing element and the housing includes a clearance, at least a portion of the securing element being insertable through the clearance and into the housing such that movement of the housing in relation to the securing element is limited in at least one degree of freedom.

10. A plug connection device as claimed in claim 9, wherein the securing element has a passage through which the contact element is inserted to connect the front region of the contact element with the plug body.

11. A plug connection device as claimed in claim 9, wherein the external perimeter of the plug body includes a diminution which the contact element engages and securing element includes a part which engages the diminution.

12. A plug connection device as claimed in claim 9, wherein at least part of the securing element is located in a displacement path of the plug body in the housing.

13. A plug connection device as claimed in claim 9, wherein the securing element connects to the contact element in a form-fitting manner.

14. A plug connection device for connecting to an electrical cable of the type having at least one conductor and for establishing a ground connection between the conductor and external component by way of a ground cable which is electrically connectable between the plug connection device and the external component, said plug connection device comprising:

(a) at least one plug connector, each plug connector including (i) a plug body which is electrically and mechanically connectable to the conductor of the electrical cable, and (ii) a housing having a receptacle which receives the plug body; said plug connection device further comprising (b) fastening means electrically and mechanically connectable to the plug connector for establishing the ground connection by way of the ground cable, the fastening means having a contact element and a connection element, the contact element and the connection element being configured integrally with one another and electrically connected with one another, the contact element having a region which plugs into the housing and makes electrical contact with the plug body, the connection element being connectable to the ground cable to establish the ground connection independently of the electrical cable, the ground connection being established via the plug body, the contact element, the connection element and the ground cable.

15. A plug connection device as claimed in claim 14, wherein the fastening means has a connection part which mechanically connects the fastening means with the housing.

16. A plug connection device as claimed in claim 15, wherein the connection part, as well as the contact element and the connection element are configured integrally with one another.

17. A plug connection device as claimed in claim 15, wherein the plug body is received into the receptacle in an axial direction, the housing has an outer wall in which a groove is present and the connection part comprises a snap-fit connection part which intrudes into the groove to mechanically connect the fastening means to the housing of the plug connector in a form fitting manner in the axial direction.

* * * * *